US012712427B2

(12) United States Patent
Kwon

(10) Patent No.: US 12,712,427 B2
(45) Date of Patent: Aug. 18, 2026

(54) ELECTRIC POWER SAVING APPARATUS USING RETURN LUMINOUS ENERGY OF INFRARED RAY SYNTHETIC WAVELENGTH EQUIPPED WITH APPARATUS FOR PROTECTING OVERLOAD

(71) Applicant: K,S,E. CO., LTD., Gyeongsangbuk-do (KR)

(72) Inventor: Young Dae Kwon, Daegu (KR)

(73) Assignee: K, S, E. CO., LTD., Gyeongsangbuk-do (KR)

( * ) Notice: Subject to any disclaimer, the term of this patent is extended or adjusted under 35 U.S.C. 154(b) by 178 days.

(21) Appl. No.: 18/839,513

(22) PCT Filed: Feb. 14, 2023

(86) PCT No.: PCT/KR2023/002170
§ 371 (c)(1),
(2) Date: Aug. 19, 2024

(87) PCT Pub. No.: WO2023/158198
PCT Pub. Date: Aug. 24, 2023

(65) Prior Publication Data

US 2025/0158505 A1 May 15, 2025

(30) Foreign Application Priority Data

Feb. 18, 2022 (KR) ........................ 10-2022-0021453

(51) Int. Cl.
*H02M 1/00* (2007.01)
*H02M 1/32* (2007.01)
*H02M 3/155* (2006.01)

(52) U.S. Cl.
CPC .......... *H02M 1/0048* (2021.05); *H02M 1/32* (2013.01); *H02M 3/155* (2013.01)

(58) Field of Classification Search
CPC ....... H02M 1/0048; H02M 1/32; H02M 3/155
See application file for complete search history.

(56) References Cited

U.S. PATENT DOCUMENTS 6,658,579 B1 * 12/2003 Bell ...................... H04L 7/0008 713/400
7,023,425 B2 * 4/2006 Casebolt ............... G06F 1/3203 713/320

(Continued)

FOREIGN PATENT DOCUMENTS

KR 10-2009-0096253 A 9/2009
KR 10-1374732 B1 4/2014

(Continued)

OTHER PUBLICATIONS

International Searching Authority, International Search Report, PCT/KR2023/002170, Dated Jun. 7, 2023, With English Translation.

(Continued)

*Primary Examiner* — Rafael O De Leon Domenech
(74) *Attorney, Agent, or Firm* — Reichel Stohry Dean LLP; Mark C. Reichel; Natalie J. Dean

(57) ABSTRACT

The present invention relates to an energy optimization power saving apparatus using return luminous energy of infrared synthetic wavelength equipped with an overload protection apparatus and provides an energy optimization power saving apparatus having a power control unit as a connection control means for controlling the on/off of an electronic brake so as to detect whether conditions in which the return luminous energy wave generated by the energy optimization power saving apparatus may become unstable have been met, and to interrupt the operational connection of the energy optimization power saving apparatus to the power supply system for a certain period of time when the luminous energy wave is determined to be unstable, so that an unstable return luminous energy wave generated by the (Continued)

energy optimization power saving apparatus is prevented from being applied to a power supply system, thus preventing a disturbance in the power supply system or a reduction in the power saving effect of the power supply system.

15 Claims, 11 Drawing Sheets

(56) References Cited

U.S. PATENT DOCUMENTS

| | | | | |
|---|---|---|---|---|
| 7,287,175 | B2 * | 10/2007 | Vereen | G06F 1/3215 713/323 |
| 2007/0247078 | A1 * | 10/2007 | Kwon | H02M 1/08 315/200 R |
| 2010/0174159 | A1 * | 7/2010 | Akizuki | A61B 5/14532 600/316 |
| 2010/0314940 | A1 | 12/2010 | Palmer et al. | |

FOREIGN PATENT DOCUMENTS

| | | | |
|---|---|---|---|
| KR | 10-2020-0079940 | A | 7/2020 |
| WO | 2015/184804 | A1 | 12/2015 |

OTHER PUBLICATIONS

International Searching Authority, Written Opinion of the International Searching Authority, PCT/KR2023/002170, Dated Jun. 7, 2023, With English Translation.

* cited by examiner

ELECTRIC POWER SAVING APPARATUS USING RETURN LUMINOUS ENERGY OF INFRARED RAY SYNTHETIC WAVELENGTH EQUIPPED WITH APPARATUS FOR PROTECTING OVERLOAD

TECHNICAL FIELD

The present invention relates to an energy-optimized power saving device that could return and supply some light energy wave, which is obtained by continuously irradiating a semiconductor device with synthetic wavelength light in a specific band of infrared region and visible light region that has passed through an optical filter and is emitted from the semiconductor device in the form of square wave (pulse) micro current, onto an electric wire connected from a power source to a load side. By returning and supplying some light energy waves onto the electric wire in this way, a wavelength of electrons is lengthened inside the electric wire through which a driving current that drives the load flows, and a pin state and a vibration state of electrons in spin movement, that can cause energy loss, can be stabilized. Therefore, in the state of motion of electrons, collisions among electrons can be alleviated; thereby energy loss can be reduced.

In this way, as an energy-optimized power saving device, hereinafter simply referred to as an Power Optimizer, using returned light energy by infrared synthetic wavelength to achieve stabilization of the power supply system and an excellent electric power saving effect therefrom. To maximize power saving efficiency, the present invention provide a characterized configuration of the energy-optimized power saving device, wherein the improvement comprises; means for preventing unstable returned light energy waves generated by the present energy-optimized power saving device in an overloaded state from being re-applied to the power supply system by turning off an electronic brake of the Power Optimizer for a certain period of time, when a condition causing an unstable state is detected, such as an over-current condition above a predetermined current value or an over-temperature condition above a predetermined temperature that occurs depending on operating conditions.

Herein, re-applying unstable returned light energy waves (or refer to 'Unstable Return Luminous Energy Wave') to the power supply system, might causes interruption of the operating connection to the power supply system, disturbance occurred in the power supply system, and reduction of the power saving effect in the power supply system. The present invention could be a device intended to suppress the occurrence of such problematic situations.

BACKGROUND ART

Various types of electric power saving device have been proposed and used for an electric circuit, actuating the load of an electric motor, an electric heater, an illuminating device, or the like, by the supply of electric energy from a power source.

In an inverter for converting direct current power into alternating current power as one of the conventional types of electric power saving device, during the first half of a half-cycle, where thyristors are triggered, the energy accumulated on a load is returned to a power source through respective diodes and; in the case of an advancing power factor, during the latter half of the half cycle, conversely, diodes are conductive. This is implementation may be referred to as a power inverter. Thus, frequencies are converted by using the power inverter to control the revolutions per minute, thereby obtaining electric power saving effects.

On the other hand, as a completely different type of power saving device, it alleviates energy loss due to heat and harmonic generation due to friction loss in electromagnetic movement in the transmission line when current is supplied from the AC power source to the electric load, and maximizes the stabilization and power saving efficiency of electrical systems by eliminating Core loss, Joule loss, and Hysteresis. Moreover, it improves the stability of the device by absorbing instantaneous surge voltage that may be included in AC power, and further improves the circuit of the power saving device. As shown in FIG. 1, a power saving device that allows the current state to be checked from the outside to easily check whether it is operating properly or not, has been filed internationally under PCT/KR2006/001520 by the applicant of the present application and disclosed as WO 2007/123280 A1. In addition, as an improved device for this, a power saving device additionally equipped with a load factor correction device was filed under PCT/KR2015/011601 and published as WO 2016/068660 A1.

As shown in FIGS. 2 and 3, a power saving device 1A has a wiring structure connected in parallel to a transmission line 2 between a AC power source 1 and a (electric) load 3. According to the case of 3-phase AC power (used in industrial loads such as various motors, coolers, blowers, compressors, air conditioners, and pumps, etc.), on the transmission line 2 between the AC power source 1 and the load 3, a breaker 4 (e.g. NFB: No Fuse Breaker) may be installed. Furthermore, it has a structure in which a breaker 5 (e.g. NFB: No Fuse Breaker) is provided outside or inside the power saving device 1A, which is connected in parallel with the load 3 through an output terminal of the breaker 4.

However, the power saving device 1A, that has been developed and used so far, is designed to provide an infrared composite wavelength of a specific band obtained by the power saving device 1A into the current (electrons) flowing along the transmission line 2 connected from the AC power source 1 to the load 3. That is, as shown in FIG. 4, the returned light energy waves by the infrared composite wavelength is generated in the form of output square wave signal energy and is returned to the transmission path between the load and the AC power source to be upstream, therefore, the spin of electrons is stabilized by the returned light energy (photon) supplied through the semiconductor device and the flow of electrons with a longer wavelength is continuously supplied, thereby lengthening the wavelength of electrons in the total current supplied to the load 3, stabilizing the spin of electrons, and reducing electrons leaving the orbit with inducing orbital correction. As a result, energy loss based on friction of electrons is alleviated and further the electromagnetic wave being generated due to electron collisions is reduced.

These effects may be appreciated by comparing the photograph where the voltage states of the conductor transmission line at the load side are measured by means of an oscilloscope, in cases where electric power saving device of this invention is not adopted in the power circuit as illustrated in FIG. 5, with the photograph where the voltage states of the conductor transmission line at the load side are measured by means of an oscilloscope, in cases where electric power saving device of this invention is adopted in the power circuit as illustrated in FIG. 6.

However, in the case of a conventional energy-optimized power saving device, it may be operated in an environment that exceeds the appropriate operating conditions as a power saving device during the period of use while connected to various industrial loads. Therefore, depending on the operating conditions or operation duration of the power saving device, unstable energy might be generated by the energy-optimized power saving device in an overload state such as when an over-current condition exceeding the appropriate value occurs, or such as when the ambient temperature around the device rises exceeding the appropriate temperature. Such unstable return luminous energy wave has the problem of causing disturbance in the power supply system or reducing the power saving effect of the power supply system as it is returned and applied to the power supply system.

SUMMARY

Technical Objects (Problems)

The present invention is to solve the common problems of the prior art described above. The technical problem of the present invention is that an energy-optimized power saving device preferentially is configured to be equipped with a main control device (Core Control Apparatus) comprising; a surge absorber for absorbing a surge current corresponding to an abnormal wave supplied from the power supply, a voltage drop unit for decreasing a voltage inputted from the power supply to supply a stable voltage to a circuit of the energy-optimized power saving device, a smoothing circuit unit for performing full-wave rectification, a circuit protection unit for preventing harmonics from entering from the power supply, and a waveform generator connected to said circuit protection unit for generating a clock of a specific pulse corresponding to the return energy according to the load. Herein, the main control device is configured to monitor the operating status or operating conditions of the Power Optimizer which is formed to return the return luminous energy wave generated (synthesized) by the output value of the said smoothing circuit unit and said waveform generator to the load side. According to the monitoring results, if the condition is judged to be overloaded, the Unstable Return Luminous Energy Wave generated by the energy-optimized power saving device (Power Optimizer) is applied to the power supply system, it provides a means to prevent disturbances from occurring or the power saving effect of the power supply system to be reduced.

In addition, by allowing the circuit current status of the energy-optimized power saving device to be checked externally, it not only makes it possible to easily check whether it is operating properly or whether it is malfunctioning, but also to adjust a setting value inducing the unstable operating conditions of the energy-optimized power saving device (Power Optimizer) to the field situation. Thereby, when the conditions for changing the settings are met, an additional technical task is to provide a means to block the connection from the energy-optimized power saving device (Power Optimizer) to the power supply system including the load.

Furthermore, as another technical object of the present invention, it provides a means for generating and returning optionally optimized return luminous energy wave even when the energy-optimized power saving device (Power Optimizer) is in normal operating conditions. Herein, for generating optionally optimized return luminous energy wave, various and selective options are available for various loads connected to the power supply system based on changes in characteristics depending on a type of load.

In addition, the present invention provides that, when the unstable operating state of the energy-optimized power saving device (Power Optimizer) repeatedly occurs, a serious performance reduction in the energy saving effect due to the operation of the device occurs. In order to prevent this performance reduction, another technical challenge is to provide a means to manage the useful life of energy-optimized power saving device from a long-term perspective.

Technical Solution

In order to solve the above-described technical problem, the present invention, in order to prevent the Unstable Return Luminous Energy Wave generated by the Power Optimizer from being applied to the power supply system, causing disturbance in the power supply system or reducing the power saving effect of the power supply system, provide an energy-optimized power saver (Power Optimizer) being equipped with a power control unit as a connection control means to control the on/off status of the electronic brake to interrupt the operating connection to the power supply system of the Power Optimizer for a certain period of time, in cases where the return light energy wave is judged to be unstable (the Return Luminous Energy Wave) by detecting whether the judgment conditions that may cause the return light energy wave generated by the energy-optimized power saving device (Power Optimizer) to become unstable (Unstable Return Luminous Energy Wave) are met or not.

And herein, said power control unit comprises: as a specific connection control means to control the on/off status of the electronic brake,

- a current control unit that controls based on the operating current value of the energy-optimized power saving device (Power Optimizer);
- a temperature control unit that controls based on the operating temperature value of energy-optimized power saving device (Power Optimizer); and
- an operation time control unit that controls based on the accumulated operation time of energy-optimized power saving device (Power Optimizer).

Furthermore, said power control unit according to the present invention additionally comprises:

- means for setting a threshold condition value for stopping operation in order to change and set a maximum set current limit value, a maximum set temperature limit value, and a maximum set one-time duration limit value according to the field situation, as an operation stopping threshold values to determine whether the energy-optimized power saving device (Power Optimizer) operates unstable.

In addition, said power control unit according to the present invention additionally comprises: an auxiliary control device connected to said waveform generator of said main control device, comprising pulse forming sub; pulse quenching sub; pulse spreading sub; and pulse recharging sub, in order to generate and return the optionally optimized return light energy wave that is selectively and optionally optimized based on changes in characteristics depending on the type of load connected to the power supply system.

Herein, the present invention provide said auxiliary control device as a sub-part that is selectively operated to ensure that the return wave generated by the main control device is stably transmitted to the load by generating and maintaining an appropriate oscillation suppression frequency depending on the type of load.

Additionally, the present invention further comprises a boot confirmation unit which may be additionally included as a device for managing the useful life of the energy-optimized power saving device, in order to prevent unstable operation of the energy-optimized power saving device (Power Optimizer) from a long-term perspective.

Here, the boot confirmation unit is preferably configured to that, in case of unstable operation of the energy-optimized power saving device (Power Optimizer), the time when the electronic brake is turned off, that is, the time when the Power Optimizer is turned off, is cumulatively counted.

And then the boot confirmation unit is configured to that alerts that the Power Optimizer is in a fault condition if the preset maximum set cumulative off time is exceeded, and manage the useful life of the Power Optimizer by blocking the booting of the Power Optimizer.

Advantageous Effects

As described above, according to the power control unit of the energy-optimized power saving device according to the present invention, the effects of preventing disturbances in the power supply system or reduction in the power saving effect of the power supply system due to the Unstable Return Luminous Energy Wave generated by the Energy Optimizer is applied to the power supply system, would be provided by interrupting the working connection of the Power Optimizer to the power supply system for a certain period of time in cases where the Return Luminous Energy Wave is judged to be unstable.

And by means of means for setting a threshold condition value for stopping operation being additionally comprised into the power control unit, it is possible to change the settings according to the field situation, which are the maximum set current limit value, the maximum set temperature limit value, and the maximum set one-time duration limit value being used as operation stop threshold conditions to determine whether the energy-optimized power saving device (Power Optimizer) is operating unstable.

And, by connecting the auxiliary control device, which comprises a pulse shaping sub, a pulse quenching sub, a pulse spreading sub, and a pulse recharging sub as sub-parts, to the waveform generator of the main control device according to the present invention, it provides the effect of generating and returning a return luminous energy wave (Return Luminous Energy Wave) that is selectively optimized based on changes in characteristics depending on the type of load being connected to the power supply system.

In addition, according to the present invention, the effective lifespan of the energy-optimized power saving device can be limited and managed, thereby preventing the energy saving effect from being lost due to use beyond the effective lifespan to the point where the performance of the power saving device is degraded.

DETAILED DESCRIPTION OF THE INVENTION

Hereinafter, embodiments that are easily performed by those skilled in the art will be described in detail with reference to the accompanying drawings. However, the embodiments of the present invention may be achieved in several different forms and are not limited to the embodiments described herein.

Figure 1:
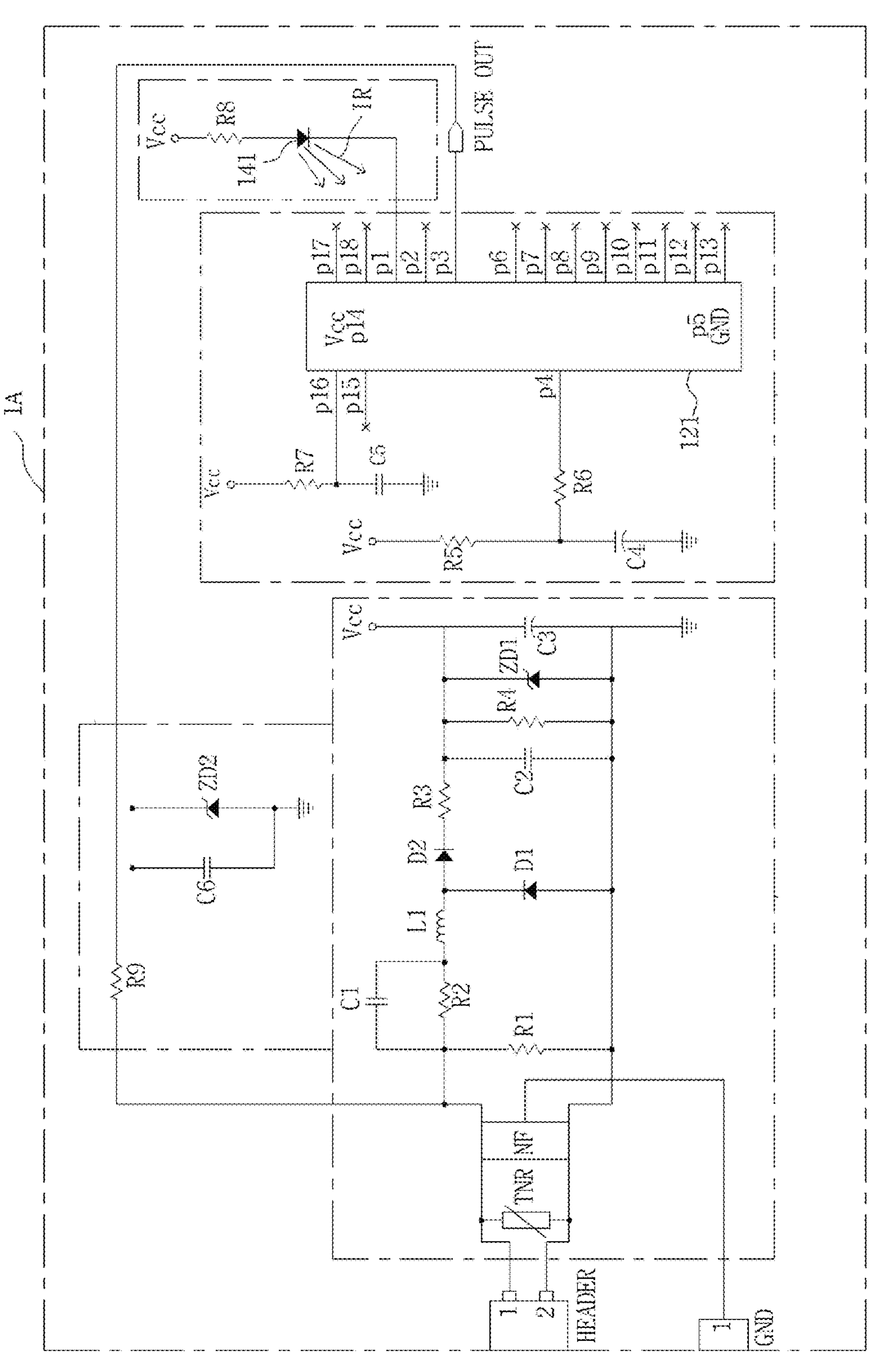
FIG. 1 is a diagram showing an embodiment of a circuit diagram constituting a power saving device according to the present applicant's prior invention.
Figure 2:
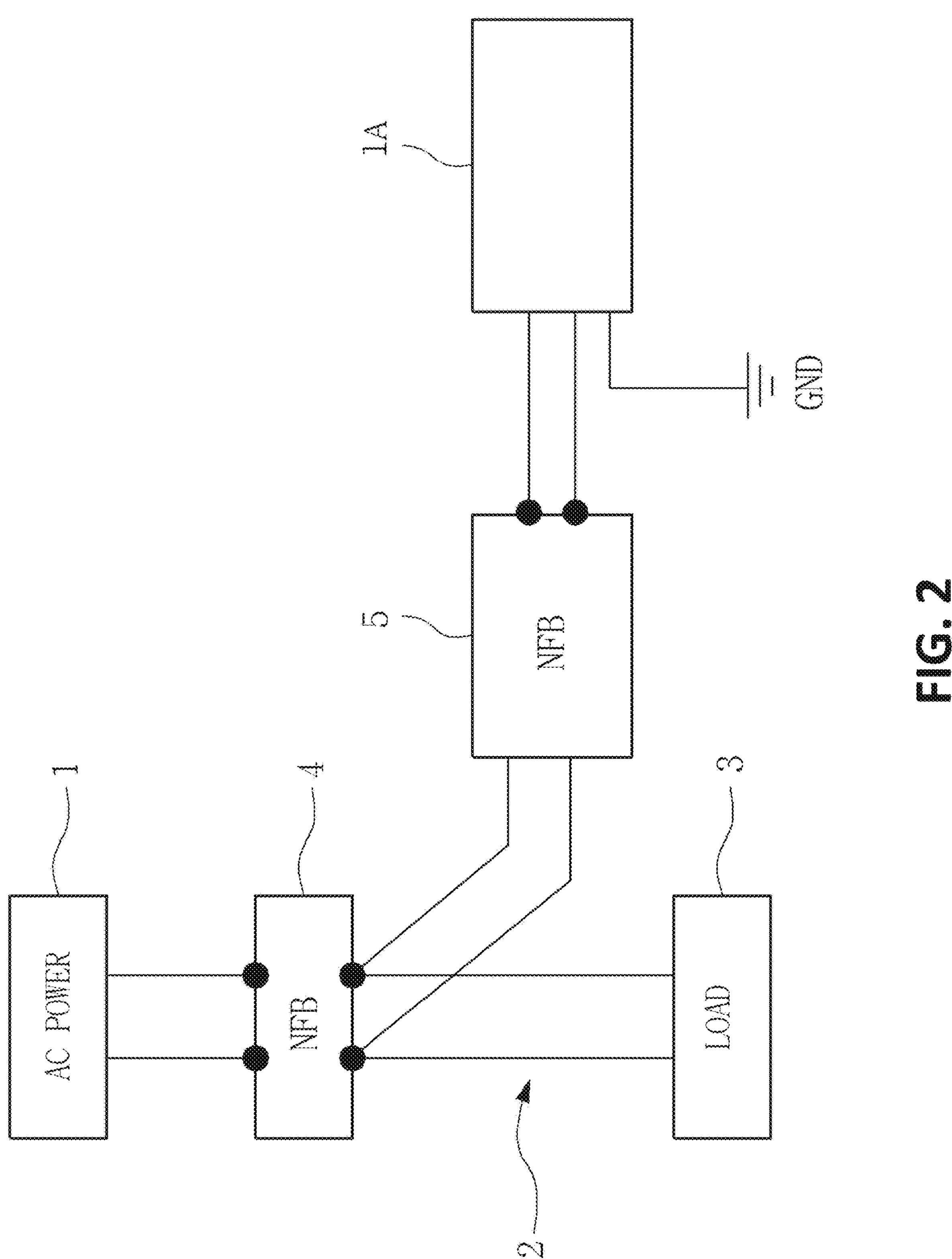
FIG. 2 is a diagram showing the conventional power saving device according to FIG. 1 connected to a single-phase power source.
Figure 3:
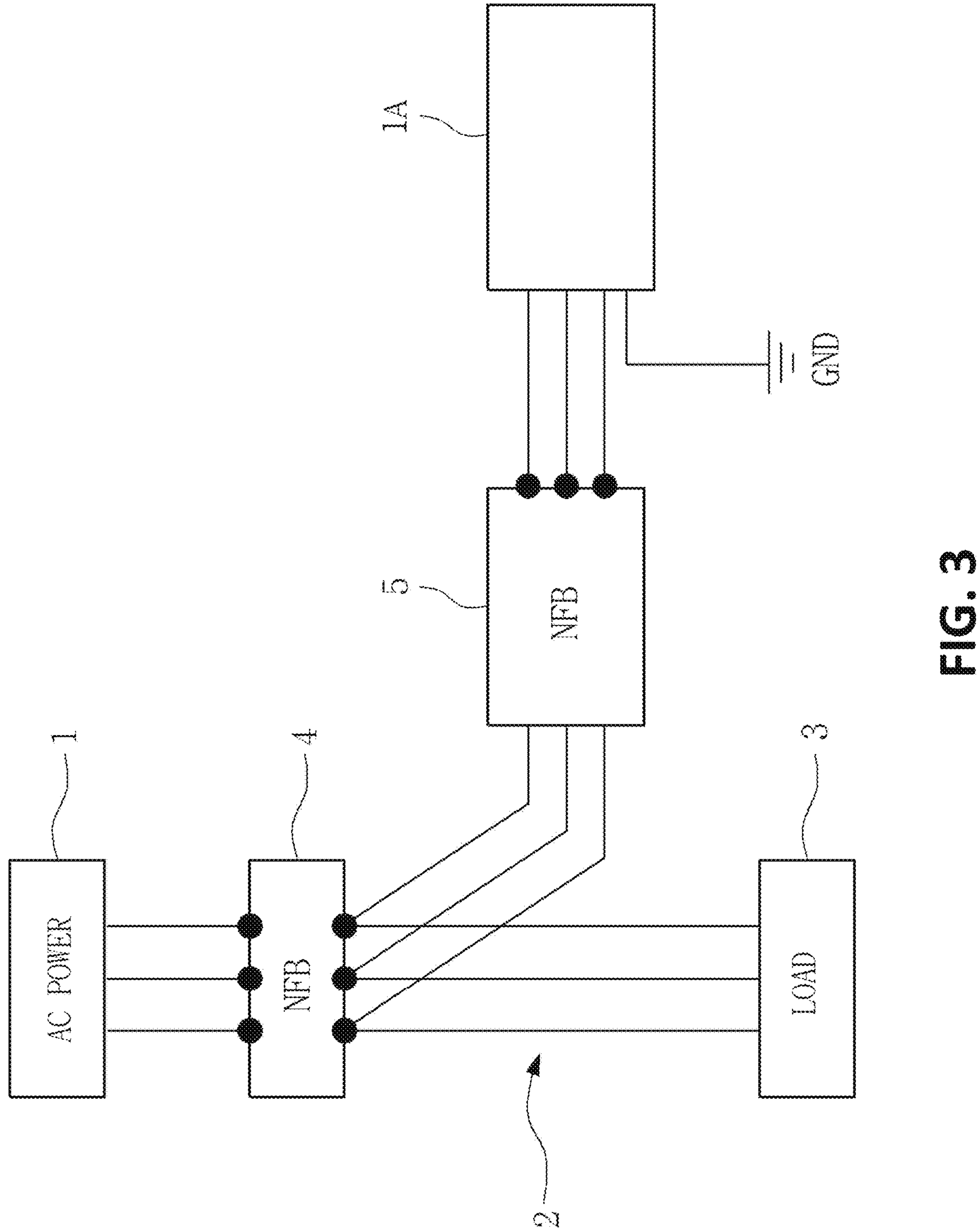
FIG. 3 is a diagram showing the conventional power saving device according to FIG. 1 connected to a three-phase power source.
Figure 4:
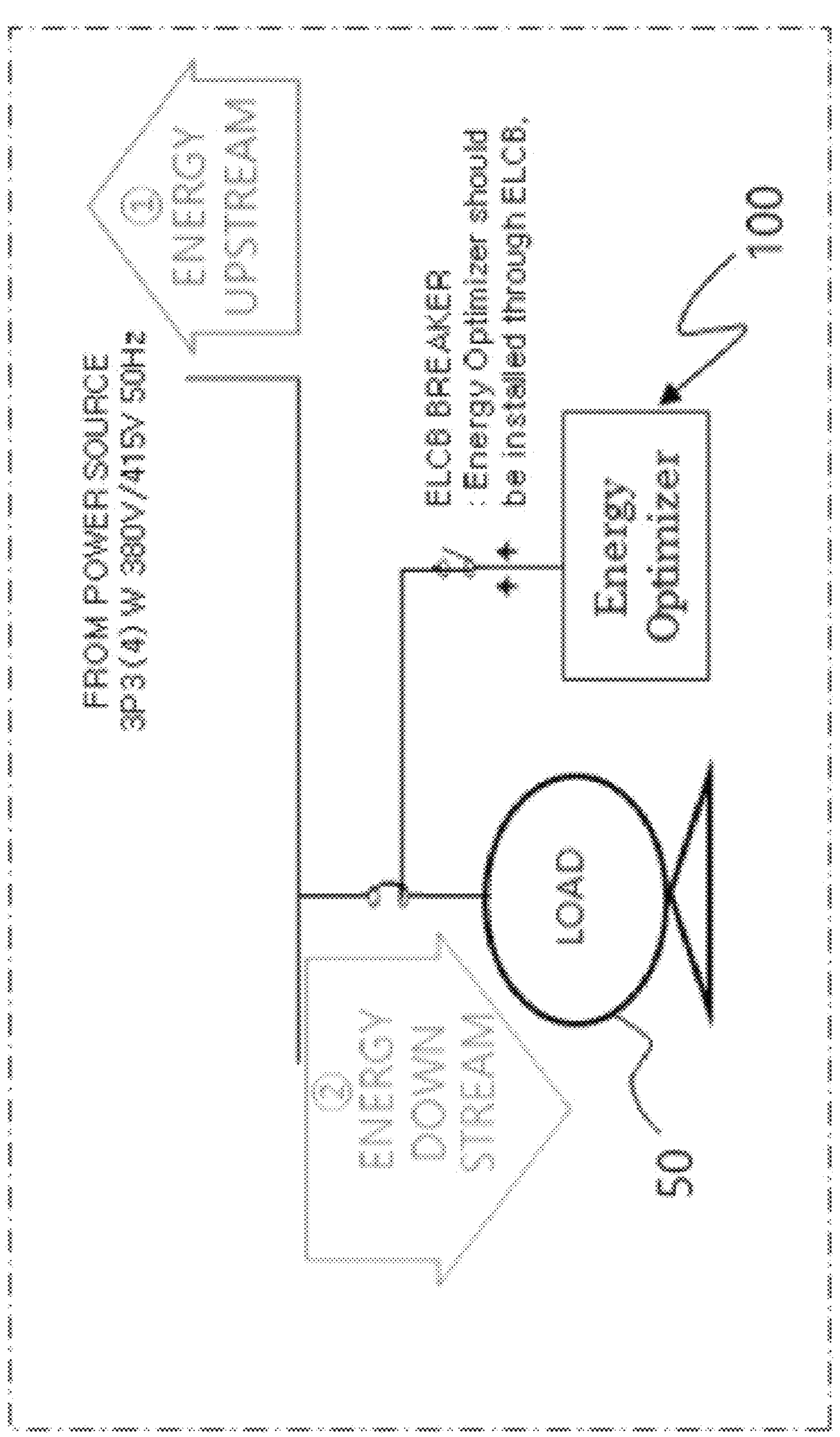
FIG. 4 is a conceptual diagram of a device showing a state in which returned light energy with infrared composite wavelength is generated in the form of output square wave signal energy and returned to the transmission path between the load circuit and the AC power source to be delivered upstream.
Figure 5:
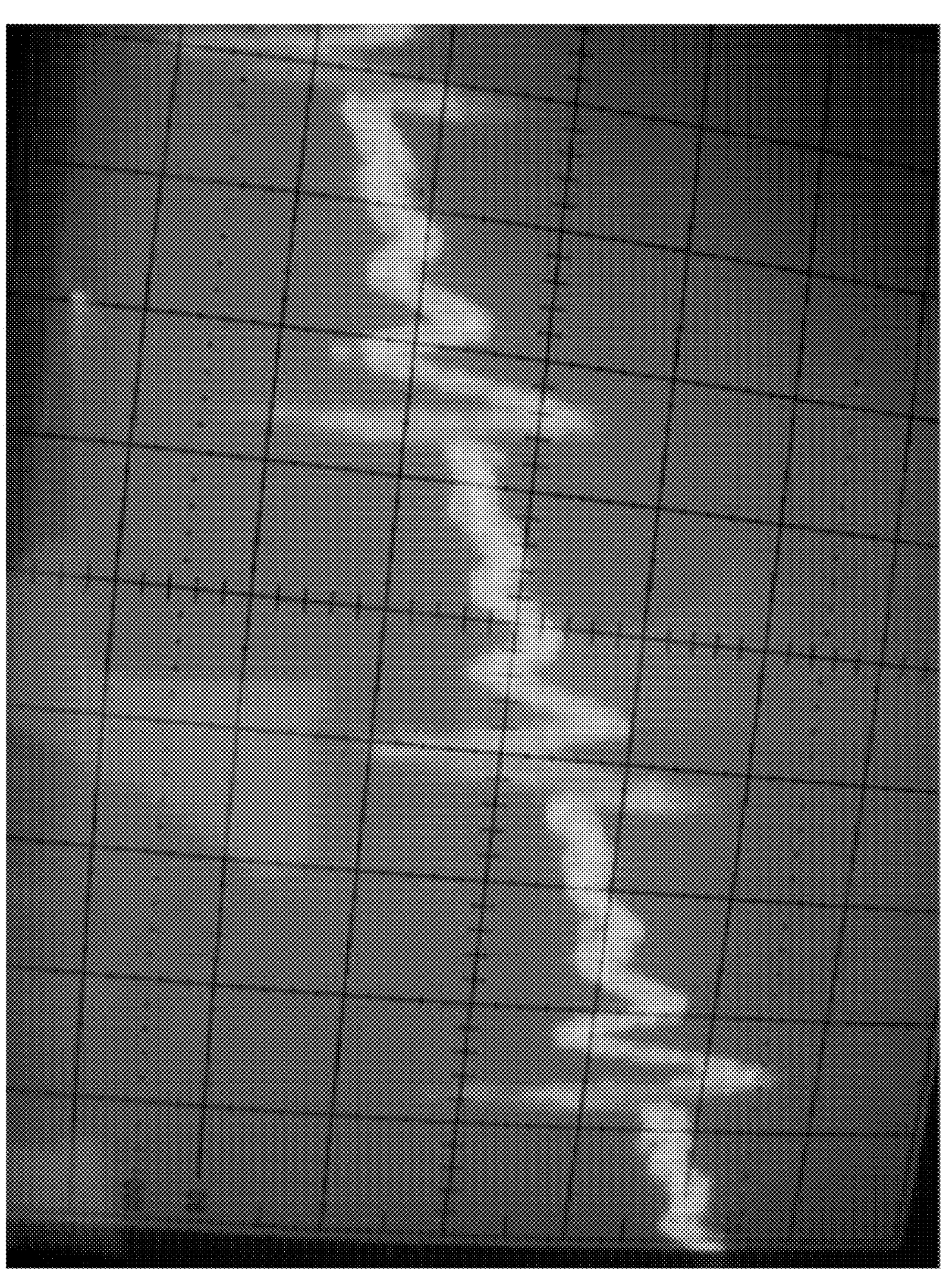
FIG. 5 is a photograph of the voltage state of the load-side conductor transmission line measured with an oscilloscope when the energy-optimized power saving device according to the present invention is not used.
Figure 6:
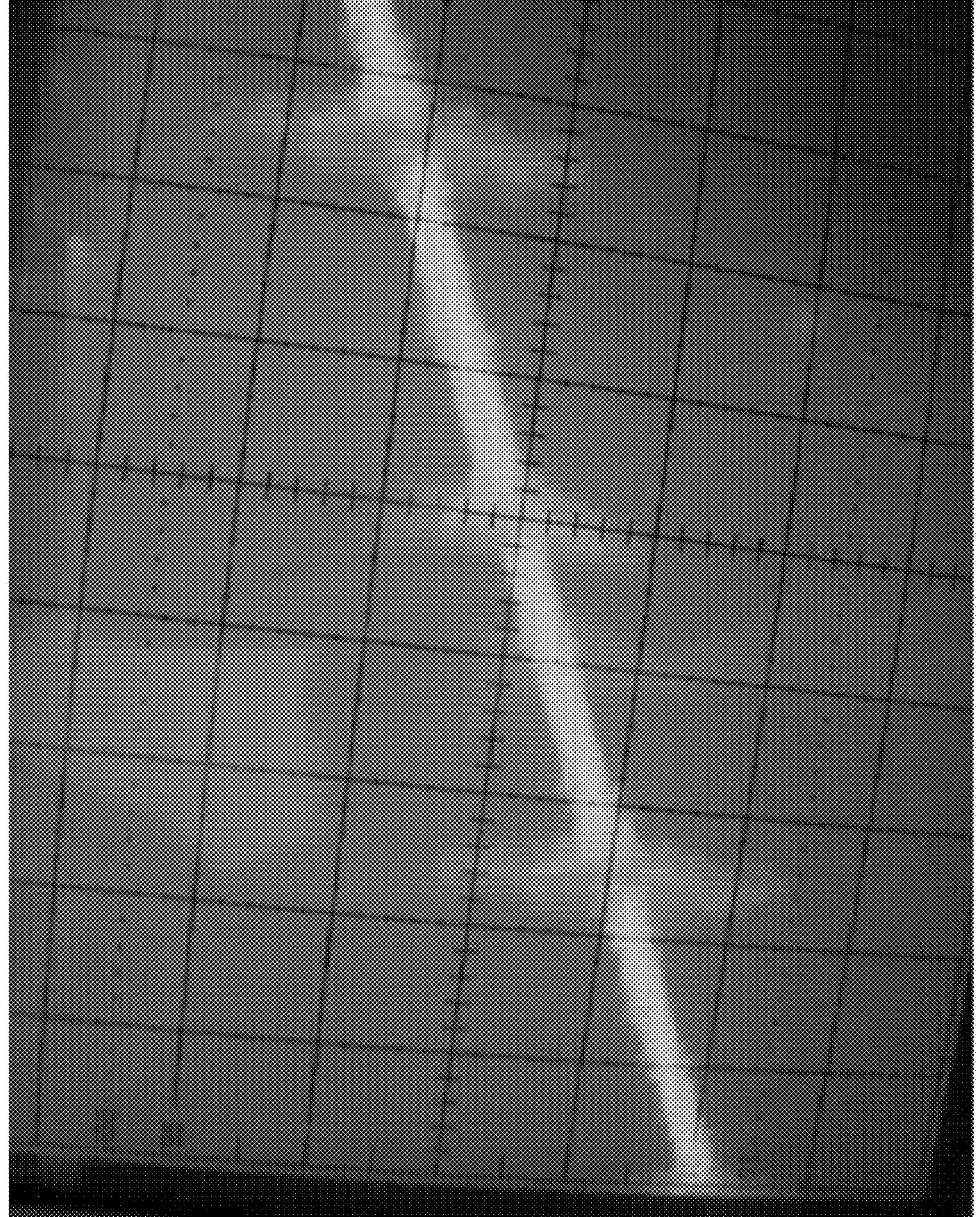
FIG. 6 is a photograph of the voltage state of the load-side conductor transmission line measured with an oscilloscope while using the energy-optimized power saving device according to the present invention.
Figure 7:
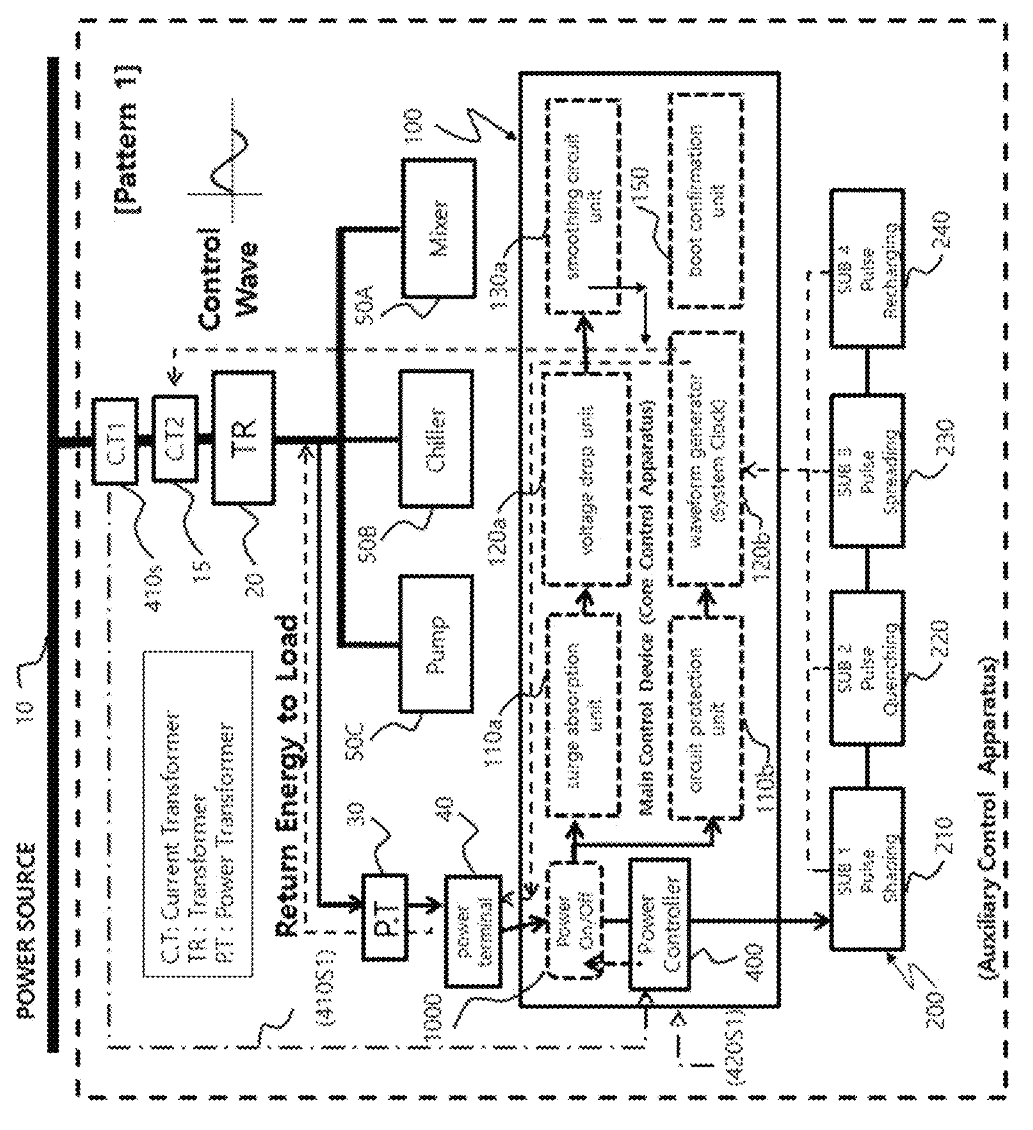
FIG. 7 is a configuration diagram showing a preferred embodiment of the present invention.
Figure 8:
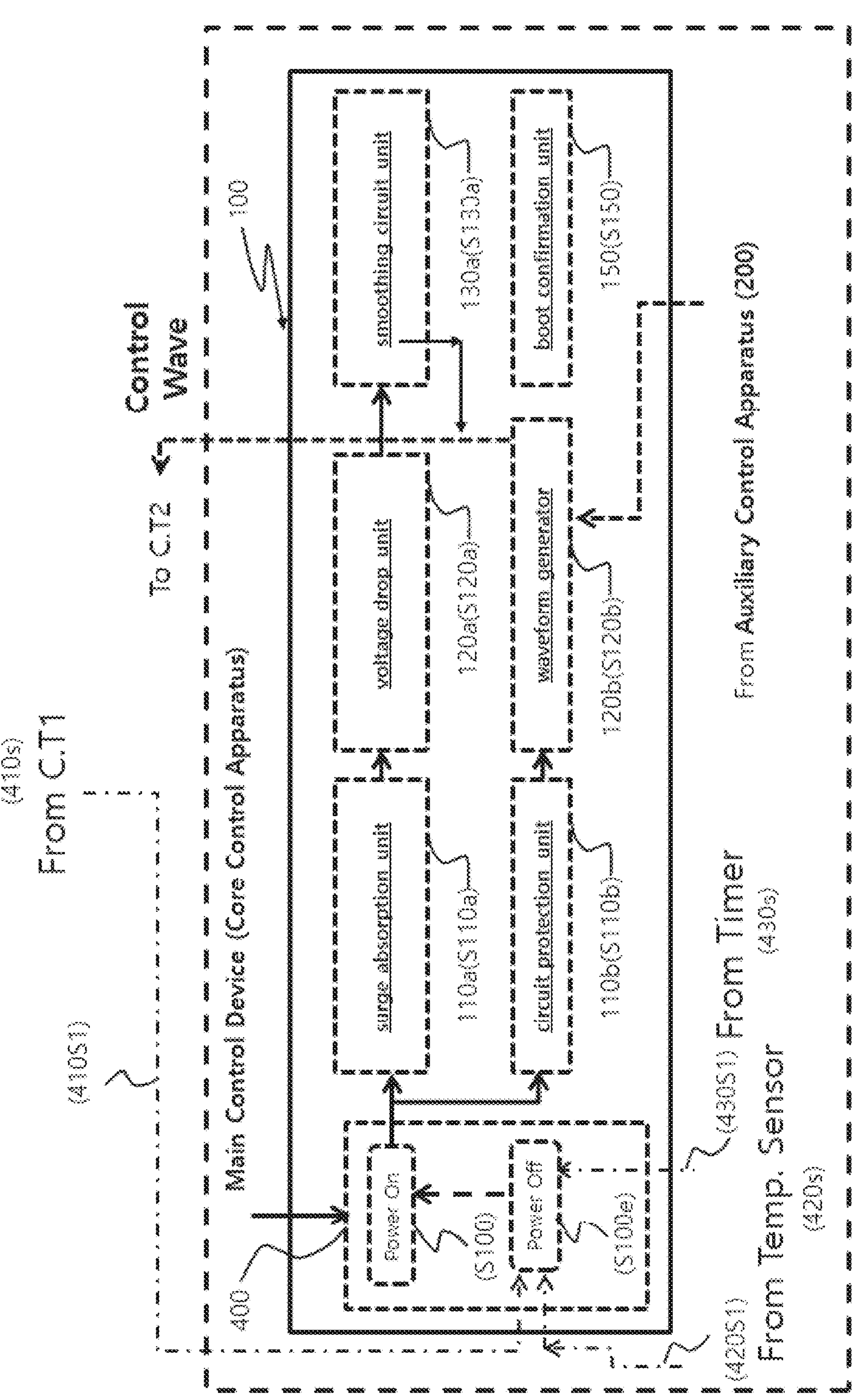
FIG. 8 is a detailed configuration diagram of the main control device constituting a preferred embodiment of the present invention shown in FIG. 7.
Figure 9:
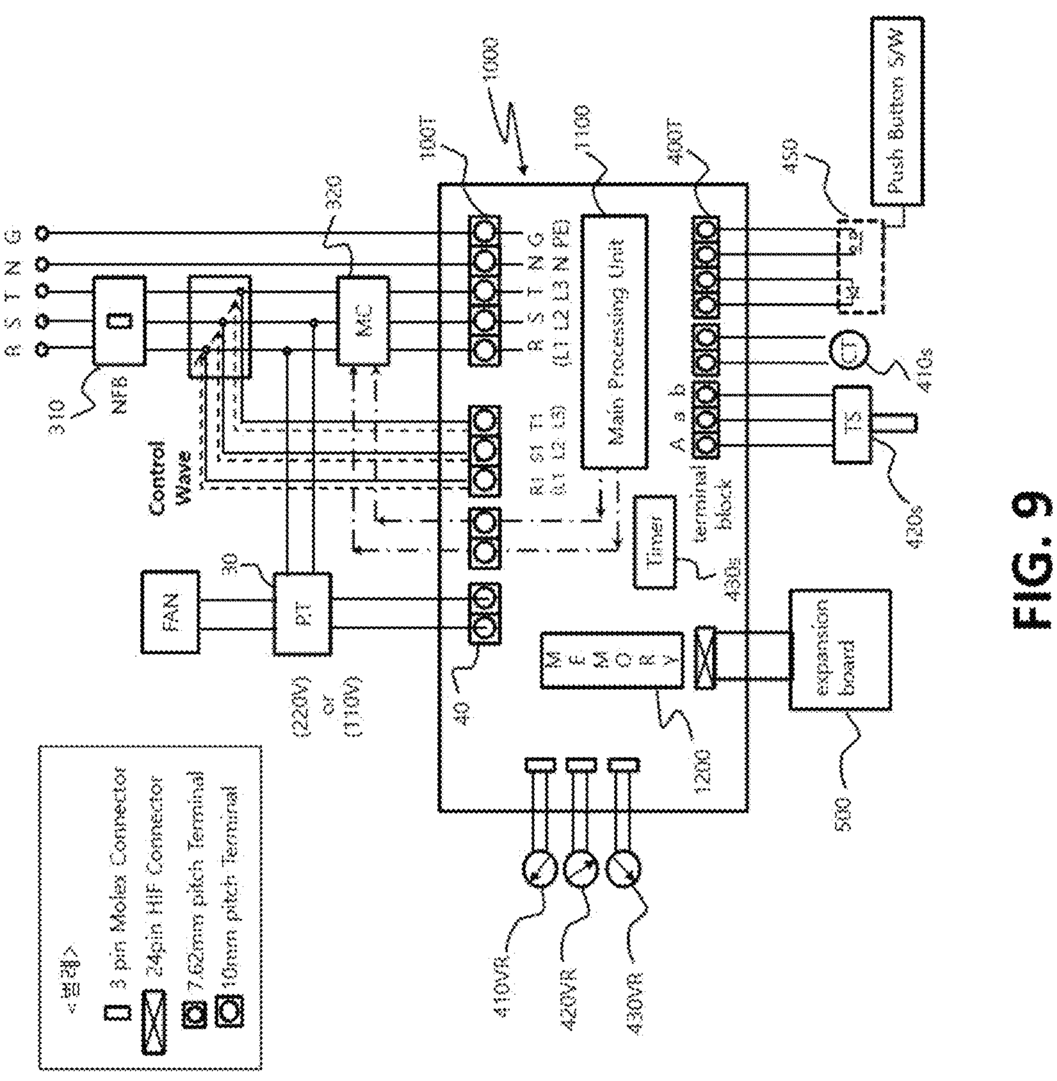
FIG. 9 is a preferred connection state diagram of an energy-optimized power saving device equipped with a main control device according to a preferred embodiment of the present invention.
Figure 10:
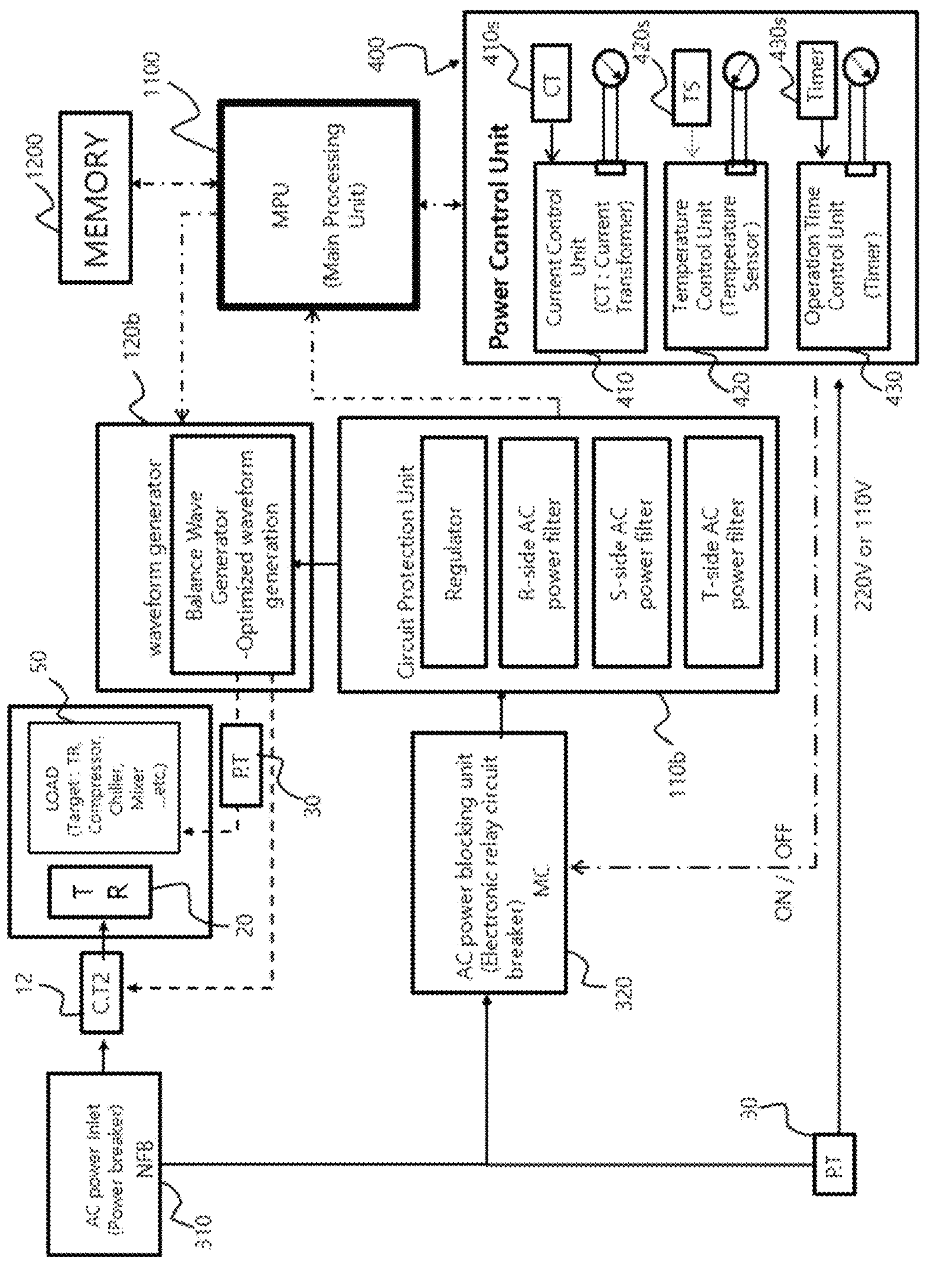
FIG. 10 is a preferred connection configuration diagram of the main control device and the power circuit connection portion of the energy-optimized power saving device according to a preferred embodiment of the present invention.
Figure 11:
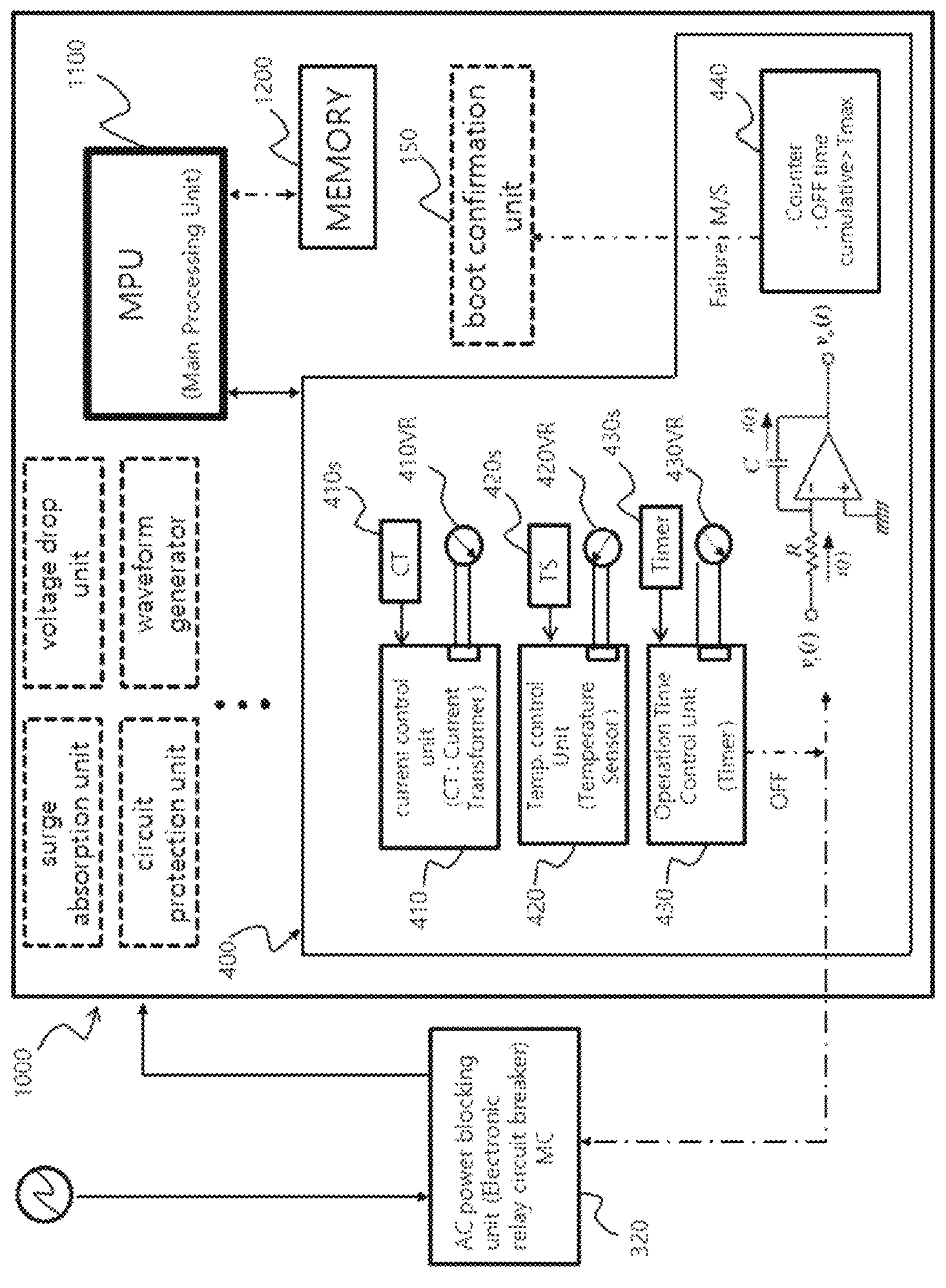
FIG. 11 is a detailed configuration diagram of a power control unit forming the main control unit of an energy-optimized power saving device according to a preferred embodiment of the present invention.

As shown in the configuration diagram of the power saving device in FIG. 7, the detailed configuration diagram of the main control device in FIG. 8, the connection diagram of the power saving device in FIG. 9, the connection configuration diagram of the main control device and the power circuit connection part in FIG. 10, and the detailed configuration diagram of the power control unit in FIG. 11, according to a preferred embodiment of the present invention, an energy-optimized power saving device (Power Optimizer) using returned luminous energy by infrared synthetic wavelength and equipped with an overload protection device, in a power supply system for supplying power from a power source (10) to various types of loads (50*a*, 50*b*, and 50*c*) such as a mixer (50*a*), a chiller (50*b*), and a pump (50*c*), an energy-optimized power saving device (100) is provided that is branched from the power supply circuit between the transformer (20; TR) installed to supply power of an appropriate voltage to the loads (50*a*, 50*b*, and 50*c*) and the loads (50*a*, 50*b*, 50*c*) and is connected through the power transformer 30 (P.T) and the power terminal (40).

This energy-optimized power saving device (1000) is generally equipped with a main control device (100; Core Control Apparatus) comprising:

- a surge absorption unit (110*a*) that absorbs (absorbing: S110*a*) the surge current corresponding to an abnormal wave from the supplied power supply;

- a voltage drop unit (120*a*) that lowers (lowering: S120*a*) the voltage of the input power supply to provide a stable voltage supply to the circuit;
- a smoothing circuit unit (130*a*) that performs (performing: S130*a*) full-wave rectification;
- a circuit protection unit (110*b*) that prevents (preventing: S110*b*) harmonics from entering from the input power supply; and
- a waveform generator (120*b*) connected to the circuit to generate (generating: S120*b*) a clock of a specific pulse corresponding to the return energy according to the load.

Herein, by providing such a main control device (100; Core Control Apparatus), the return luminous energy wave generated (synthesized) by the output value of the smoothing circuit unit (130*a*) and the waveform generator (120*b*) is returned to the load side. At this time, the return path diagram of the return luminous energy wave (indicated by a dotted arrow and "Return Energy to Load" or "Control Wave" in the drawing) has the following two paths to be possible as shown in FIG. 7.

A) waveform generator (120*b*)→current transformer (15) →power source (10)

B) waveform generator (120*b*)→power terminal (40) →power transformer (30)→load (50*a*, 50*b*, 50*c*)

Herein, said energy-optimized power saving device (1000)) (Power Optimizer), as shown in FIGS. 7 to 9, is provided in order to prevent disturbances in the power supply system or reduction in the power saving effect of the power supply system in case that the returned luminous energy wave generated by the energy-optimized power saving device (Power Optimizer) is unstable (Unstable Luminous Energy Wave).

In case that the operating current measurement value, operating temperature measurement value, and operating time counter value detected, respectively, from the current transformer (410*s*), the temperature sensor (420*s*), and the timer (430*s*; see FIG. 9) are exceeding to a preset maximum set limit value (maximum set current limit value, maximum set temperature limit value, and the maximum set one-time duration limit value, first of all, a power control unit (power controller: 400) of the main control device (100; Core Control Apparatus) determine that the return luminous energy wave is judged to be unstable.

After determining that the return luminous energy wave is unstable, the electronic brake (320) is turned off to stop the operation connection to the power supply system of the energy-optimized power saving device (Power Optimizer) for a certain period of time. It is characterized by having a power control unit as a connection control means for controlling the device to be turned on again.

Herein, it have been achieved to determine whether the possible judgment conditions (over-current, excessive temperature, excessive operating time) if the operating current measurements detected from the current transformer (410*s*), operating temperature detected from the temperature sensor (420*s*), and operating time counter value detected from the timer (430*s*; see FIG. 9) exceeds the preset maximum setting limit value (maximum set current limit value, maximum set temperature limit value, maximum set one time duration limit value).

At this time, if the operating current measurement value exceeds the maximum set current limit value, for example, 28 Ampere, the judgment condition that the returned light energy wave may become unstable (Unstable Luminous Energy Wave) is treated as being achieved. And if the operating temperature measurement value exceeds the maximum set temperature limit, for example 35° C., the judgment condition that the return luminous energy wave may become unstable, is treated as being achieved. And then, if the operating time counter value exceeds the maximum set one-time duration limit, for example, 20 days (480 hours), the judgment condition that the return luminous energy wave may become unstable is treated as having been achieved.

If this determination condition is achieved, the power control unit (400) turns off the electronic break (320) for a certain time interval. In this way, the duration that the electronic brake (320) of the power control unit (400) is turned off and then stopped, may be set to, for example, 1 to 12 hours, preferably 3 to 4 hours.

Meanwhile, with reference to FIGS. 8 to 10, a more detailed configuration and description of the power control unit (400) constituting the main control device (100) (Core Control Apparatus) constituting a preferred embodiment of the present invention shown in FIG. 7 will be described.

The power control unit (400) receives an operating current measurement value (410S1), an operating temperature measurement value (420S1), or an operating time counter value (430S1) from the current transformer (410*s*), the temperature sensor (420*s*), and the timer (430*s*) (see FIG. 9), and the current control unit (410), the temperature control unit (420), or the operation time control unit (430) determines that it is less than or equal to the maximum set current limit value, the maximum set temperature limit value, and the maximum set one-time duration limit value, respectively. In this case, the electronic brake (320) is turned on to maintain the operating connection to the power supply system of the energy-optimized power saving device (Power Optimizer) (S100; "Power On"). At this time, if it is determined that the maximum set current limit value, the maximum set temperature limit value, or the maximum set one-time duration limit value is exceeded, the electronic brake (320) is turned off to activate the energy-optimized power saving device (Power Optimizer). It is configured to cut off (S100*e*; "Power Off") the power connection to the Power Optimizer.

Therefore, the power control unit (400), as shown more specifically in FIGS. 9 and 10, comprises:

- a current control unit (410) that controls based on the operating current measurement value (410S1) of the energy-optimized power saving device (Power Optimizer) obtained from the current transformer (410*s*) (CT: Current Transformer);
- a temperature control unit (420) that controls based on the operating temperature measurement value (420S1) obtained from the temperature sensor 420*s* (TS: temperature sensor) of the energy optimization power saving device (Power Optimizer); and
- an operation time control unit (430) that controls based on an operation time counter value (430S1) obtained by a timer (430*s*) (Timer) of the energy-optimized power saving device (Power Optimizer).

Furthermore, the operation stop threshold condition value setting means (410VR, 420VR, 430VR) can be additionally comprised so that the maximum set current limit value (e.g., 28 amperes), the maximum set temperature limit value (e.g., 35° C.), and the maximum set one-time duration limit value (e.g., 480H) as a stop threshold condition value for determining whether the energy-optimized power saving device (Power Optimizer) operates unstable, can be changed and set according to the field situation.

Furthermore, the energy-optimized power saving device (Power Optimizer) according to the present invention includes a selectively operated sub-part which generate and return a return luminous energy wave that is selectively optimized based on changes in characteristics depending on the type of load (50*a*, 50*b*, 50*c*) connected to the power supply system, thereby stabilizing the return wave generated by the main control device to the load.

Here, the auxiliary control apparatus (200) comprises: as the sub-part,

- a pulse forming unit (SUB 1: Pulse Forming Sub) (210) formed to create an environment so that the generated waves are not easily destroyed due to excessive oscillation for various reasons;
- a pulse quenching unit (SUB 2: Pulse Quenching Sub) (220) formed to generate a frequency to suppress the growth of periodic oscillations;
- a pulse spreading unit (SUB 3: Pulse Spreading Sub) (230) formed to transmit auxiliary energy to continuously spread the frequency generated by the pulse quenching unit (SUB 2: 200) (at the same intensity); and
- a pulse recharging unit (SUB 4: Pulse Recharging Sub)) (240) formed to maintain a stable supply by charging the frequency generated by the pulse quenching unit (SUB 2: 220) and replenishing the pulse spreading unit (SUB 3: 230).

It is additionally included by being connected to the waveform generator (120*b*) of the main control device (100) as shown FIGS. 9 and 10.

For example, in the case where the load (50*a*, 50*b*, 50*c*) connected to the power supply system is a pump (50*c*) operating at high pressure, in order to alleviate the impact on the rotating shaft of the pump, the pulse shaping unit (210), the pulse quenching unit (220), the pulse spreading unit (230), and the pulse recharging unit (240) are operated in conjunction. And as a result, in the waveform generator (120*b*) of the main control device (100), control waveform (Balanced Control Wave) is generated with being optimized at the pump (50*c*) in operating at high pressure. Then this optimized control waveform (Balanced Control Wave) is returned to the load and power source to minimize energy lost due to impact on the pump's rotating shaft, thereby realizing energy-optimized power saving.

Here, preferably, the energy-optimized power saving device (Power Optimizer) can implement a connection configuration between the main control device of the energy-optimized power saving device and the power circuit connection as shown in FIG. 10 of the accompanying drawing. According to this connection configuration, the three-phase AC power (R, S, T) supplied through the no-fuse brake (310; NFB) provided as the AC power inlet is connected to the inlet terminal (100T) of the energy-optimized power saving device (1000). Also this connection configuration further comprises: a main processing unit (1100) that performs On/Off connection control of an electronic relay breaker (320) (MC: Micro Contactor) provided as an electronic brake (320) that serves as a controlling AC power cut/off unit; memory (1200); terminal block (400T); push button switch (450); and an expansion board (500).

Here, the physically implemented main processing unit (1100) and memory (1200) in an embodiment refer to the main control device (100), the auxiliary control device (200), and the power control unit (400)), which were previously presented as functional components. As shown in FIG. 9, it may be formed to be functionally included, but in contrast, as shown in FIG. 10, the main functional parts according to the present invention are implemented as separate devices (110*b*. 120*b*, 400) and are implemented as general components of the entire device. It could be implemented so that only the control part is handled by the main processing unit (1100; MPU).

In addition, in order to prevent unstable operation of the energy-optimized power saving device (1000) from a long-term perspective, the present invention is provided as an electronic brake (320) during unstable operation of the energy-optimized power saving device (Power Optimizer), as shown in FIG. 11.

When the time for turning off the electronic relay breaker (320), that is, the power saving device off time, counted by the cumulative counter (440) exceeds the preset maximum cumulative off time (Tmax), it would be more preferable to additionally comprise a boot confirmation unit (150) as a device for managing the useful life of the energy-optimized power saving device by blocking booting of the energy-optimized power saving device while warning that the device is in a failure state.

On the other hand, as shown in FIG. 9, the energy-optimized power saving device (1000) may additionally include an expansion board (500) installed on an electronic circuit board implementing the same, and the notebook computer can be connected through the expansion board (500). Terminals including computers, portable tablets, PDAs, etc. can be connected, and can be configured to enable current control, temperature control, and operation time control by inputting values through a program running on a terminal such as a connected laptop. The functions and control results of the energy-optimized power saving device (1000) that are controlled at the same time can be checked through terminals such as laptops, and further, with lot-based control, all or part of the energy-optimized power saving device (1000) can be turned on/off or remotely controlled. It would be more desirable to configure it so that it can be turned on/off.

Although the preferred embodiments of the present invention have been described in detail above, the scope of the present invention is not limited thereto, and various modifications and improvements made by those skilled in the art using the basic concept of the present invention defined in the following claims are also possible to fall within the scope of rights.

The invention claimed is:

1. An apparatus for energy-optimized power saving using returned light energy by infrared synthetic wavelength with overload protection device, comprising:

- a power control unit (400) as a connection control means to control the on/off status of the electronic brake (320) to interrupt the operating connection to a power supply system of an energy-optimized power saving device (1000) (Power Optimizer) for a certain period of time, in cases where the return light energy wave is judged to be unstable (the Return Luminous Energy Wave) by detecting whether the judgment conditions that may cause the return light energy wave generated by the energy-optimized power saving device (Power Optimizer) to become unstable (Unstable Return Luminous Energy Wave) are met or not, in order to prevent the Unstable Return Luminous Energy Wave generated by the Power Optimizer from being applied to the power supply system, causing disturbance in the power supply system or reducing the power saving effect of the power supply system.

2. An apparatus for energy-optimized power saving according to claim 1, wherein said power control unit (400) comprises: as a specific connection control means to control the on/off status of the electronic brake (320), a current control unit (410) that controls based on the operating current value (410S1) that is received through a current transformer (410*s*) of the energy-optimized power saving device;

a temperature control unit (420) that controls based on the operating temperature value (420S1) that is received through a temperature sensor (420*s*) of the energy-optimized power saving device; and an operation time control unit (430) that controls based on the accumulated operation time (430S1) that is received through a timer (430*s*) of the energy-optimized power saving device, and characterized in that said power control unit (400) receives an operating current measurement value (410S1), an operating temperature measurement value (420S1), or an operating time counter value (430S1) from the current transformer (410*s*), the temperature sensor (420*s*), and the timer (430*s*), and characterized in that said power control unit (400) is configured to:

in case that the current control unit (410), the temperature control unit (420), or the operation time control unit (430) determines that it is less than or equal to the maximum set current limit value, the maximum set temperature limit value, and the maximum set one-time duration limit value, respectively, that the electronic brake (320) is turned on (S100; "Power On") to maintain the operating connection to the power supply system of the energy-optimized power saving device, and in case that, if it is determined that the maximum set current limit value, the maximum set temperature limit value, or the maximum set one-time duration limit value is exceeded, that the electronic brake (320) is turned off to activate the energy-optimized power saving device and to cut off (S100*e*; "Power Off") the power connection to the Power Optimizer.

3. An apparatus for energy-optimized power saving according to claim 2, wherein said power control unit further comprises:

means (410VR, 420VR, 430VR) for setting a threshold condition value for stopping operation in order to change and set a maximum set current limit value, a maximum set temperature limit value, and a maximum set one-time duration limit value according to the field situation, as an operation stopping threshold values to determine whether the energy-optimized power saving device operates unstable.

4. An apparatus for energy-optimized power saving according to claim 3, wherein said energy-optimized power saving device (1000) is equipped with a main control device (100; Core Control Apparatus) comprising:

a surge absorption unit (110*a*) that absorbs (absorbing: S110*a*) the surge current corresponding to an abnormal wave from the supplied power supply;

a voltage drop unit (120*a*) that lowers (lowering: S120*a*) the voltage of the input power supply to provide a stable voltage supply to the circuit;

a smoothing circuit unit (130*a*) that performs (performing: S130*a*) full-wave rectification;

a circuit protection unit (110*b*) that prevents (preventing: S110*b*) harmonics from entering from the input power supply; and a waveform generator (120*b*) connected to the circuit to generate (generating: S120*b*) a clock of a specific pulse corresponding to the return energy according to the load, and wherein the return luminous energy wave generated (synthesized) by the output value of the smoothing circuit unit (130*a*) and the waveform generator (120*b*) is returned to the load side.

5. An apparatus for energy-optimized power saving according to claim 4, wherein said energy-optimized power saving device further comprises:

an auxiliary control device (200) connected to said waveform generator (120*b*) of said main control device (100), and wherein said auxiliary control device (200) is comprises:

pulse forming sub; pulse quenching sub; pulse spreading sub; and pulse recharging sub, in order to generate and return the optionally optimized return light energy wave that is selectively and optionally optimized based on changes in characteristics depending on the type of load connected to the power supply system.

6. An apparatus for energy-optimized power saving according to claim 5, wherein said energy-optimized power saving device further comprises:

a boot confirmation unit (150) which may be additionally included as a device for managing the useful life of the energy-optimized power saving device, in order to prevent unstable operation of the energy-optimized power saving device from a long-term perspective, and wherein the boot confirmation unit (150) is configured to that, in case of unstable operation of the energy-optimized power saving device, the time when the electronic brake is turned off, that is, the time when the Power Optimizer is turned off, is cumulatively counted, and then the boot confirmation unit (150) is configured to that alerts that the Power Optimizer is in a fault condition if the preset maximum set cumulative off time is exceeded, and manage the useful life of the Power Optimizer by blocking the booting of the Power Optimizer.

7. An apparatus for energy-optimized power saving according to claim 6, wherein said energy-optimized power saving device further comprises:

an expansion board (500) installed on an electronic circuit board implementing the same, and wherein a notebook computer is connected through the expansion board (500), wherein terminals including the notebook computer connected is configured to enable current control, temperature control, and operation time control by inputting values through a program running on the terminal, wherein the functions and control results of the energy-optimized power saving device (1000) that are controlled at the same time can be checked through the terminals such as laptops, and further wherein, with Iot-based control, all or part of the energy-optimized power saving device (1000) is configured to be turned on/off or remotely controlled.

8. An apparatus for energy-optimized power saving according to claim 2, wherein said energy-optimized power saving device (1000) is equipped with a main control device (100; Core Control Apparatus) comprising:

a surge absorption unit (110*a*) that absorbs (absorbing: S110*a*) the surge current corresponding to an abnormal wave from the supplied power supply;

a voltage drop unit (120*a*) that lowers (lowering: S120*a*) the voltage of the input power supply to provide a stable voltage supply to the circuit;

a smoothing circuit unit (130*a*) that performs (performing: S130*a*) full-wave rectification;

a circuit protection unit (110*b*) that prevents (preventing: S110*b*) harmonics from entering from the input power supply; and a waveform generator (120*b*) connected to the circuit to generate (generating: S120*b*) a clock of a specific pulse corresponding to the return energy according to the load, and wherein the return luminous energy wave generated (synthesized) by the output value of the smoothing circuit unit (130*a*) and the waveform generator (120*b*) is returned to the load side.

9. An apparatus for energy-optimized power saving according to claim 8, wherein said energy-optimized power saving device further comprises:

an auxiliary control device (200) connected to said waveform generator (120*b*) of said main control device (100), and wherein said auxiliary control device (200) is comprises:

pulse forming sub; pulse quenching sub; pulse spreading sub; and pulse recharging sub, in order to generate and return the optionally optimized return light energy wave that is selectively and optionally optimized based on changes in characteristics depending on the type of load connected to the power supply system.

10. An apparatus for energy-optimized power saving according to claim 9, wherein said energy-optimized power saving device further comprises:

a boot confirmation unit (150) which may be additionally included as a device for managing the useful life of the energy-optimized power saving device, in order to prevent unstable operation of the energy-optimized power saving device from a long-term perspective, and wherein the boot confirmation unit (150) is configured to that, in case of unstable operation of the energy-optimized power saving device, the time when the electronic brake is turned off, that is, the time when the Power Optimizer is turned off, is cumulatively counted, and then the boot confirmation unit (150) is configured to that alerts that the Power Optimizer is in a fault condition if the preset maximum set cumulative off time is exceeded, and manage the useful life of the Power Optimizer by blocking the booting of the Power Optimizer.

11. An apparatus for energy-optimized power saving according to claim 10, wherein said energy-optimized power saving device further comprises:

an expansion board (500) installed on an electronic circuit board implementing the same, and wherein a notebook computer is connected through the expansion board (500), wherein terminals including the notebook computer connected is configured to enable current control, temperature control, and operation time control by inputting values through a program running on the terminal, wherein the functions and control results of the energy-optimized power saving device (1000) that are controlled at the same time can be checked through the terminals such as laptops, and further wherein, with Iot-based control, all or part of the energy-optimized power saving device (1000) is configured to be turned on/off or remotely controlled.

12. An apparatus for energy-optimized power saving according to claim 1, wherein said energy-optimized power saving device (1000) is equipped with a main control device (100; Core Control Apparatus) comprising:

a surge absorption unit (110*a*) that absorbs (absorbing: S110*a*) the surge current corresponding to an abnormal wave from the supplied power supply;

a voltage drop unit (120*a*) that lowers (lowering: S120*a*) the voltage of the input power supply to provide a stable voltage supply to the circuit;

a smoothing circuit unit (130*a*) that performs (performing: S130*a*) full-wave rectification;

a circuit protection unit (110*b*) that prevents (preventing: S110*b*) harmonics from entering from the input power supply; and a waveform generator (120*b*) connected to the circuit to generate (generating: S120*b*) a clock of a specific pulse corresponding to the return energy according to the load, and wherein the return luminous energy wave generated (synthesized) by the output value of the smoothing circuit unit (130*a*) and the waveform generator (120*b*) is returned to the load side.

13. An apparatus for energy-optimized power saving according to claim 12, wherein said energy-optimized power saving device further comprises:

an auxiliary control device (200) connected to said waveform generator (120*b*) of said main control device (100), and wherein said auxiliary control device (200) is comprises:

pulse forming sub; pulse quenching sub; pulse spreading sub; and pulse recharging sub, in order to generate and return the optionally optimized return light energy wave that is selectively and optionally optimized based on changes in characteristics depending on the type of load connected to the power supply system.

14. An apparatus for energy-optimized power saving according to claim 13, wherein said energy-optimized power saving device further comprises:

a boot confirmation unit (150) which may be additionally included as a device for managing the useful life of the energy-optimized power saving device, in order to prevent unstable operation of the energy-optimized power saving device from a long-term perspective, and wherein the boot confirmation unit (150) is configured to that, in case of unstable operation of the energy-optimized power saving device, the time when the electronic brake is turned off, that is, the time when the Power Optimizer is turned off, is cumulatively counted, and then the boot confirmation unit (150) is configured to that alerts that the Power Optimizer is in a fault condition if the preset maximum set cumulative off time is exceeded, and manage the useful life of the Power Optimizer by blocking the booting of the Power Optimizer.

15. An apparatus for energy-optimized power saving according to claim 14, wherein said energy-optimized power saving device further comprises:

an expansion board (500) installed on an electronic circuit board implementing the same, and wherein a notebook computer is connected through the expansion board (500), wherein terminals including the notebook computer connected is configured to enable current control, temperature control, and operation time control by inputting values through a program running on the terminal, wherein the functions and control results of the energy-optimized power saving device (1000) that are controlled at the same time can be checked through the terminals such as laptops, and further wherein, with Iot-based control, all or part of the energy-optimized power saving device (1000) is configured to be turned on/off or remotely controlled.

* * * * *